United States Patent

Thomas

[15] 3,642,462
[45] Feb. 15, 1972

[54] GLASSWARE-FORMING MACHINE BLOW MOLD STATION

[72] Inventor: Joseph Thomas, Millville, N.J.
[73] Assignee: Maul Bros., Inc., Millville, N.J.
[22] Filed: Feb. 20, 1970
[21] Appl. No.: 13,252

[52] U.S. Cl. ................................ 65/242, 65/260, 65/261, 65/239, 65/241, 65/229, 65/361, 65/360
[51] Int. Cl. ........................................... C03b 9/00
[58] Field of Search .............. 65/242, 260, 237, 239, 241, 65/229, 261, 360, 361

[56] References Cited

UNITED STATES PATENTS

| | | | |
|---|---|---|---|
| 1,601,836 | 10/1926 | Stenhouse | 65/242 |
| 2,018,030 | 10/1935 | O'Neill et al. | 65/260 X |
| 2,811,814 | 11/1957 | Winder | 65/239 |
| 716,478 | 12/1902 | Reeves | 65/242 |
| 1,549,920 | 8/1925 | Nigh | 65/361 X |
| 1,405,204 | 1/1922 | Graham | 65/237 X |
| 2,376,602 | 5/1945 | Kinker | 65/242 X |
| 3,375,915 | 4/1968 | Fouse | 65/241 X |

*Primary Examiner*—Frank W. Miga
*Attorney*—Seidel, Gonda & Goldhammer

[57] ABSTRACT

The bottom plate adapter at a blow molding station of a glassware-forming machine is selectively movable toward and away from the longitudinal axis of the post on which mold arms are rotatably supported. Mold halves are pivotably supported on the mold arms and adapted to cooperate with the bottom plate adapter. The adapter moves toward and away from the post after the mold arms rotate to a mold open position.

6 Claims, 5 Drawing Figures

INVENTOR
JOSEPH THOMAS
BY
Seidel, Gonda & Goldhammer
ATTORNEYS.

GLASSWARE-FORMING MACHINE BLOW MOLD STATION

This invention relates to a glassware-forming machine, and more particularly, to a blow mold station of such a machine. The bottom plate adapter is constructed in a manner whereby it may be moved toward and away from the post which rotatably supports the mold arms. The purpose of providing such movement is to solve the problem presently characteristic of existing machines.

With existing machines, there is a limit to the size of the bottle which can be manufactured. When the mold arms are in their mold open position, tongs or other mechanical devices are utilized for transporting the finished glassware to a conveyor. The extent to which the mold arms may rotate is fixed. Accordingly, there is a limit which is reached wherein the bottles can be of no greater diameter. When bottles having a diameter greater than the limit are reached, they cannot be moved upwardly since to do so would cause engagement between a portion of the bottle and a shoulder of the mold. The present invention solves this problem by making the bottom plate adapter reciprocable whereby bottles of greater transverse dimensions may be made on existing glassware-forming machines than could otherwise be made on such machines.

The present invention is particularly adapted for use in an I.S. machine. These letters stand for the words "individual section." An I.S. or individual section machine is per se known to those skilled in the art and exemplified by U.S. Pat. No. 1,911,119. Since such machines are well known to those skilled in the art, only the blow mold station and the structure forming a part of the present invention are illustrated and described hereinafter.

It is an object of the present invention to provide a novel blow mold station for a glassware forming machine, having a movable bottom plate adapter.

It is another object of the present invention to provide a novel blow mold station for a glassware forming machine wherein bottles of larger transverse dimensions may be made on the same machine.

It is another object of the present invention to provide means which are simple, inexpensive and reliable for increasing the transverse dimensions of bottles which can be made on existing I.S. machines.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
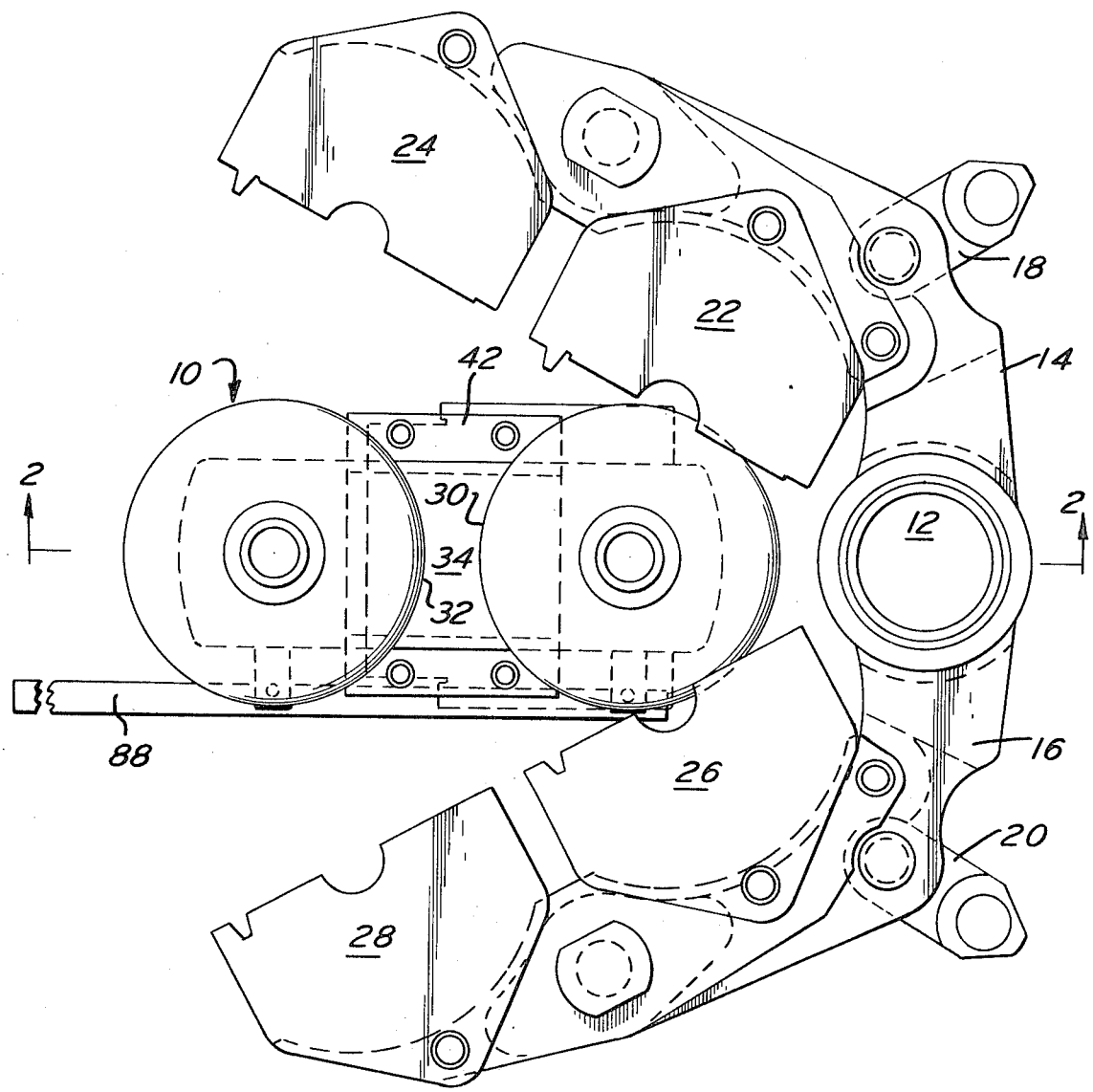
FIG. 1 is a top plan view of a blow mold station of an individual section machine showing the mold arms in their mold open position.

Referring to the drawing in detail, wherein like numerals indicate like elements, there is shown in FIG. 1 a blow mold station of a glassware-forming machine of the I.S. type with the mold arms in the mold open position. As illustrated in FIG. 1, the bottles are of sufficiently large transverse dimensions that one of the bottles cannot be moved upwardly without interfering with a portion of the molds.

As shown in FIG. 1, there is provided a vertically disposed post 12 on which are rotatably mounted a cooperating pair of mold holder arms 14 and 16. A link 18 is rotatably connected to arm 14 to cause actuation of the same. A similar link 20 is pivotably connected to arm 16 to effect actuation of the same. Mold halves 22 and 24 are pivotably supported by the mold arm 14. Mold halves 26 and 28 are pivotably supported by the mold arm 16. Mold halves 22 and 26 are adapted to cooperate with one another. Mold halves 24 and 28 are adapted to cooperate with one another.

The bottles formed within the molds are designated 30 and 32. As illustrated in FIG. 1, the bottle 30 cannot be raised upwardly by removal tongs without engaging the shoulder on the mold halves 22 and 26. In order to facilitate the manufacture of glassware having transverse dimensions larger than those permitted by the machine, a bottom plate adapter assembly is provided and adapted to move toward and away from the longitudinal axis of post 12. With the mold arms in their mold open position, there will be described hereinafter a means for selectively moving the bottom plate adapter assembly in a direction away from the longitudinal axis of post 12, whereby each of the bottles 30 and 32 may then be raised vertically by takeout tongs without any interference with the mold halves. Such takeout tongs or equivalent devices are well known to those skilled in the art and need not be described in detail.

Figure 5:
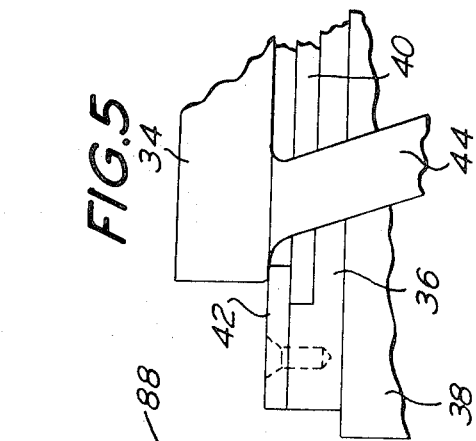
FIG. 5 is a partial end view taken along line 5—5 in FIG. 2.

The bottom plate adapter assembly includes a bottom plate adapter 34 having a slide plate 40 secured to its bottom surface. The slide plate 40 is received within a channel on the upper surface of a carriage plate 36. The carriage plate 36 is mounted on the upper surface of a bracket 38 which in turn is removably connected to the frame 11. Clamp bars 42 are removably connected to the carriage plate 36 and overlie side edge portions of the slide plate 40. See FIG. 5. The top surface of bottom plate adapter 34 and the bottom surface of slide plate 40 must be parallel within 0.003 inch over any distance of 6 inches.

Figure 2:
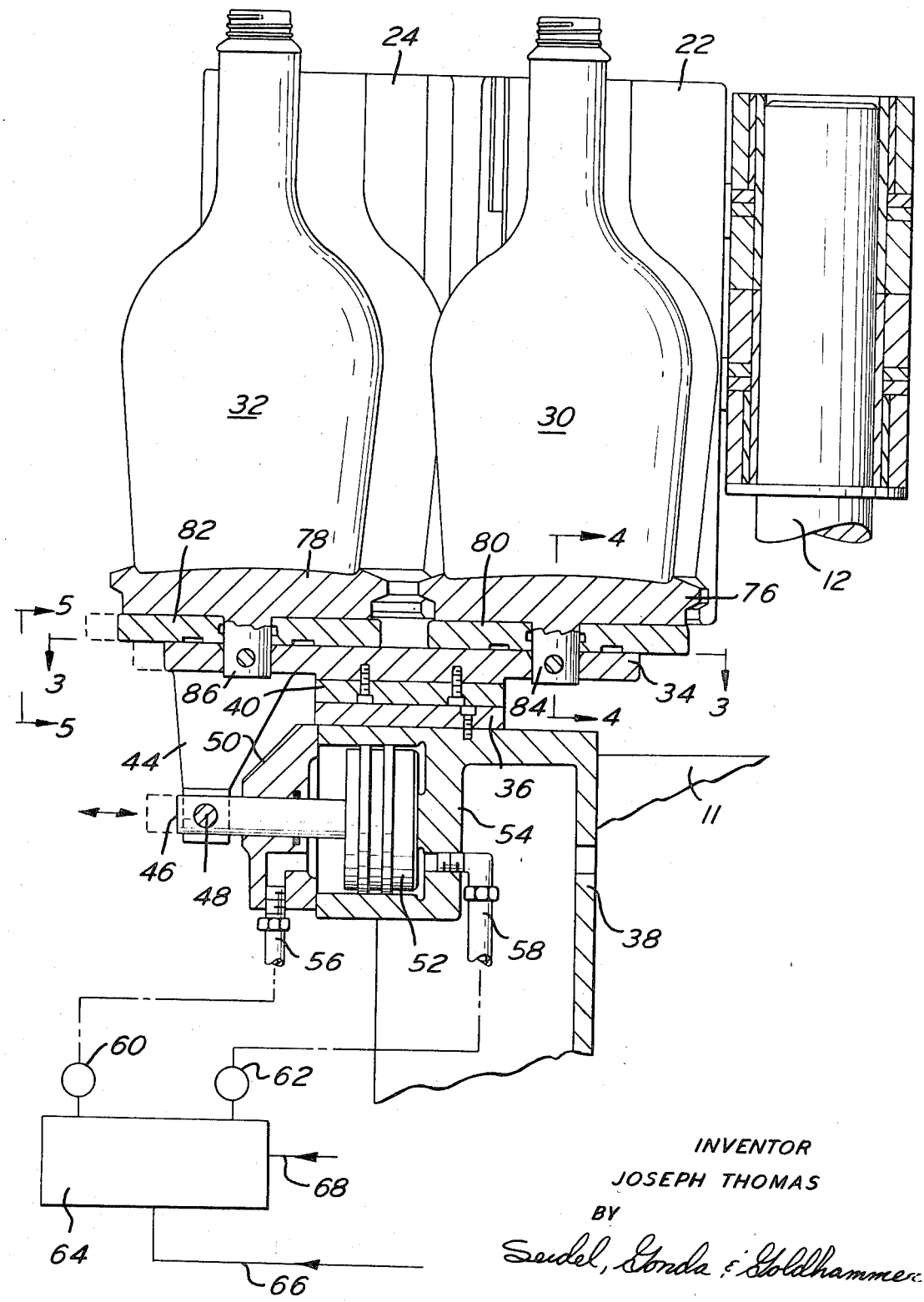
FIG. 2 is a sectional view taken along the line 2—2 in FIG. 1.

The left-hand end of the bottom plate adapter 34 in FIG. 2 is provided on its bottom surface with a pair of downwardly extending and converging legs 44 which are connected to a horizontally disposed piston 5 46 by means of a pin 48. The piston rod 46 is slidably received in a bore in a cylinder head 50 and has its longitudinal axis parallel to said adapter 34. The right-hand end of the piston rod 46 in FIG. 2 is connected to piston 52 disposed within the cylinder 54. Cylinder 54 is integral with the bracket 38.

Conduit 56 has one end in communication with the cylinder on one side of piston 52 by way of the cylinder head 50. Conduit 58 has one end in communication with the opposite side on the piston 52. Conduit 56 is provided with a flow control valve 60. Conduit 58 is provided with a flow control valve 62. Each of the conduits 56 and 58 are coupled to a spool valve 64. A source of air is in communication with the spool valve 64 by way of conduit 66. Air from the valve block manifold for tripping the spool valve 64 is supplied thereto by way of conduit 68.

Figure 3:
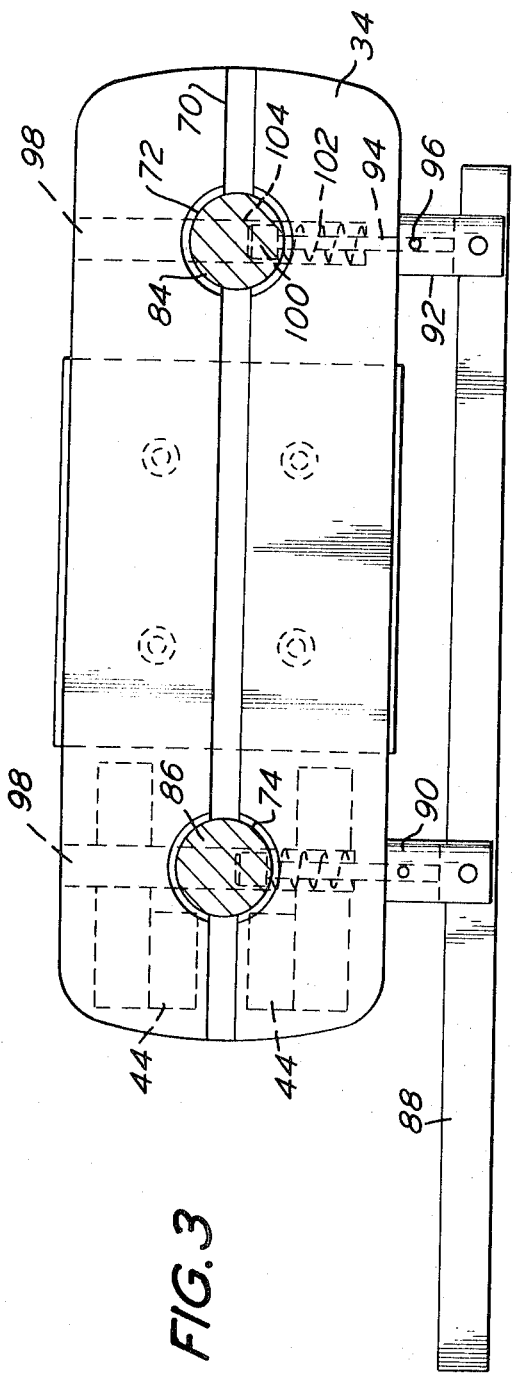
FIG. 3 is a sectional view taken along the line 3—3 in FIG. 2.
Figure 4:
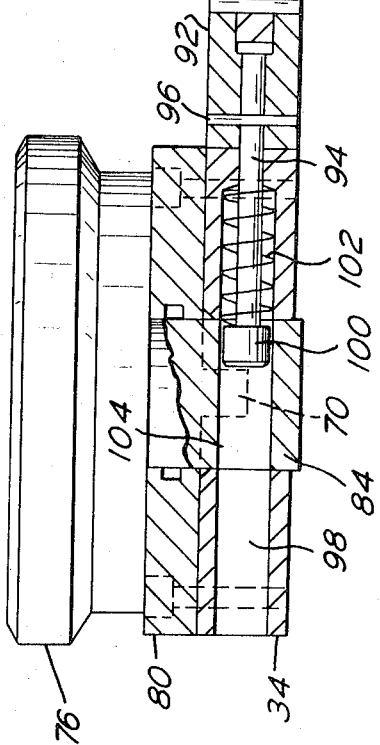
FIG. 4 is a sectional view taken along line 4—4 in FIG. 2.

As shown more clearly in FIG. 3 and 4, the upper surface of the bottom adapter plate 34 is provided with a longitudinally extending channel 70 extending for the entire length of the adapter and having a depth of approximately one-half the thickness of the adapter. Holes 72 and 74 are provided in the bottom adapter 34 along the length of the channel 70.

In order to form the bottle 30, the mold halves 22 and 26 cooperate with a seat 76 having a stem 84 extending through a pad 80. The stem 84 is removably coupled to the bottom adapter plate 34. Likewise, the mold halves 24 and 28 cooperate with a seat 78 having a stem 86 which extends through a pad 82. Stem 86 extends through holes 74 in bottom adapter plate 34 and is removably coupled thereto.

Each of the stems 84 and 86 is removably coupled to the bottom adapter 34 in the same manner. Hence, only the structure associated with stem 84 will be described in detail. Referring to FIGS. 3 and 4, a lever 88 is pivotably connected to axially spaced clevises 90 and 92. Lever 88 is disposed alongside the bottom adapter plate 34. A plunger 94 is fixed to clevis 92 by means of pin 96. A transverse bore 98 is provided in the bottom plate adapter 34.

The bore 98 extends from one side of the bottom plate adapter 34 and terminates short of the opposite side. A reduced diameter bore forms a continuation of bore 98. Plunger 94 extends through the reduced diameter bore and terminates in a head 100 within the bore 98. Spring 102 biases the head to the left in FIG. 4, thereby maintaining the clevis 92 in engagement with a side face of the bottom plate adapter 34.

In this position of the elements, the head 100 extends into a transverse bore 104 in the stem 84, thereby removably latching the stem 84 to the bottom plate adapter 34. As will be apparent from FIG. 3, the bore 104 has the same transverse dimensions as the bore 98.

The means for removably latching the stem 86 to the bottom plate adapter 34 is identical with that described above. Each of the removable latching means is actuatable by the lever 88. In order to remove seat 76 or 78, it is only necessary to grasp the lever 88 and cause the same to move downwardly in FIG. 3, thereby compressing the springs until the plungers heads are removed from the bores in the stems 84 and 86. Thereafter, the seats may be manually raised. The latching and delatching of the seats is accomplished without the use of fasteners of any kind and is done manually without the use of any tools. As a result thereof, latching and delatching of mold seats is accomplished in a rapid manner so as to minimize any downtime of the machine.

The manner in which bottles are formed at a blow molding station of an I.S. machine is well known to those skilled in the art. Accordingly, it is not deemed necessary to explain the same. It is believed that the following explanation of the apparatus illustrated would be sufficient in order for a man skilled in the art to understand the present invention. After the mold arms 14 and 16 move to their mold open position as shown in FIG. 1, motive fluid from conduit 68 trips the spool valve 64 whereby motive fluid from conduit 66 will flow through conduit 58 and cause the piston 52 to move to the left in FIG. 2. Depending upon the size of the bottles, the length of piston travel may be short on the order of five-eighths of an inch. Movement of the piston 52 to the left in FIG. 2 causes the bottom plate adapter assembly and its bottles 30 and 32 to move to the left in FIGS. 1 and 2, thereby positioning the bottles in a location whereby they may be moved upwardly without interference with the mold halves.

After the bottles have been removed by tongs or other takeout mechanisms, the motive fluid from conduit 68 ceases to operate on the spool valve 64. This causes the valve member in spool valve 64 to shift to a position wherein motive fluid from conduit 68 flows through conduit 56 and moves the piston 52 to the position as shown in FIG. 2. Thereafter, partially formed bottles may be positioned between the mold halves and the mold arms may move to a closed position. Thereafter, the partially formed bottles will be blown to the completely formed disposition by conventional apparatus, not shown, and thereby assume the shape of bottles 30 and 32 which were formed during the previous cycle. Thereafter, the process is repeated.

It should be apparent that conduit 56 is vented to atmosphere when conduits 66 and 58 communicate by way of spool valve 64. Likewise, conduit 58 is vented to atmosphere when conduits 66 and 56 communicate by way of spool valve 64. The motive fluid is preferably pressurized air.

The present invention may be embodied in other specific forms without departing from the spirit or essential attributes thereof and, accordingly, reference should be made to the appended claims, rather than to the foregoing specification as indicating the scope of the invention.

I claim:

1. A glassware-forming I.S. machine comprising a frame supporting a blow mold station thereon, said station including a bottom plate adapter for cooperation with mold halves, a vertical post having a fixed axis adjacent to the adapter for rotatably supporting mold arms on which mold halves are to be supported for limited pivotable movement with respect to said post and for cooperation with said adapter, means for enabling bottles to be removed from between mold halves by selectively reciprocating the adapter horizontally toward and away from the longitudinal axis of the post after the mold halves are pivoted to an open disposition so that the bottle adjacent the post may be removed even though the mold halves would not otherwise permit such removal, said means including a cylinder supported by the frame in a position below the elevation of said adapter, a piston in the cylinder, a piston rod having one end connected to the piston in the cylinder, said piston rod being generally parallel to the direction of movement of the adapter, a member interconnecting the piston rod and said adapter so that movement of the piston causes movement of the adapter, and means connected to said cylinder for introducing a motive fluid into the cylinder on opposite sides of the piston for selectively moving the piston within said cylinder.

2. A glassware-forming machine in accordance with claim 1 including mold seats removably supported on said adapter at spaced points on said adapter, said mold seats including a stem, each stem extending through a hole in the bottom plate adapter, said means for removably coupling the seats to the adapter including a plunger for each stem, each stem having a hole receiving one of the plungers, said bottom plate adapter having a pair of transverse bores, each plunger being in one of the bores, and means for selectively moving the plungers along the bore to facilitate latching and delatching of the stems with respect to the bottom plate adapter.

3. A machine in accordance with claim 2 including a mounting bracket, a carriage plate on the bracket having a channel on its upper surface, a slide plate on the bottom plate adapter received in said channel, a clamp bar secured to the carriage plate and overlying a side edge portion of the slide plate, said bracket including a cylinder containing a piston, a piston rod having one end connected to said piston, the other end of said piston rod being connected to said bottom plate adapter, the longitudinal axis of said piston rod being generally parallel to said bottom plate adapter.

4. A glassware-forming I.S. machine comprising a blow mold station having a horizontal bottom plate adapter having two mounting holes in a row, a vertical stationary post perpendicular to said row adjacent the adapter for rotatably supporting mold holder arms mounted for limited pivotable movement from a closed position over the adapter to an open position wherein they are spaced from one another, means for selectively reciprocating the adapter horizontally toward and away from the longitudinal axis of said post when the mold holder arms are in their open position so that the bottle adjacent the posts may be removed even though the mold halves would not otherwise permit such removal, said means for moving the adapter including a stationary cylinder supported below the adapter, a piston in the cylinder, a piston rod having one end connected to the piston, the longitudinal axis of said piston being parallel to a line interconnecting the axes of said holes and the direction of movement of the bottom plate adapter, a member interconnecting the other end of the piston rod and said bottom plate adapter, and valved means connected to the cylinder for selectively introducing a motive fluid to opposite sides of the piston within the cylinder to effect reciprocation of said adapter toward and away from the post when the mold holder arms are in their open position.

5. A machine in accordance with claim 4 including a mold seat removably supported in each hole on said bottom plate adapter by means of a spring-biased plunger which extends into a hole means in a stem on the seat, said stem being vertically disposed and extending into the bottom plate adapter, said bottom plate adapter supporting said plunger and spring.

6. A machine in accordance with claim 5 including a manually operable lever connected to said plunger for moving said plunger in a direction which compresses said spring and withdraws the plunger from said hole means.

* * * * *